June 28, 1938.  W. G. WILSON  2,122,169
LIQUID POWER TRANSMISSION DEVICE
Filed Sept. 14, 1936  3 Sheets-Sheet 1

W. G. Wilson
INVENTOR

By Glascock, Downing & Seebold
Attys.

Patented June 28, 1938

2,122,169

UNITED STATES PATENT OFFICE 2,122,169

LIQUID POWER TRANSMISSION DEVICE

Walter Gordon Wilson, Winchester, England

Application September 14, 1936, Serial No. 100,773
In Great Britain September 14, 1935

9 Claims. (Cl. 60—54)

This invention relates to liquid power transmission devices of the kind in which the power input member and the power output member are preferably both concentric relatively to one another.

Such apparatus may be of the type comprising two half casings facing one another, one being driven by a motor and constituting a pump element and the other forming a turbine element carried on the shaft to be driven. A suitable liquid is circulated between and through radial passages from one member, through the other member and back again after the manner of a Fottinger wheel so that a closed liquid circuit is maintained. Such a closed liquid circuit may be said, when the device is in operation, to thus continuously extend through the driving part, the driven or load receiving part, and a reaction member after which the cycle is repeated, and such radial passages may be curved or straight. Such a reaction member is included in the circuit when the device is to be used as a torque converter.

In the following it will be assumed that the reaction member comprises a series of radial or substantially radial vanes mounted on a rotatory hub carried concentrically on the central axis of the torque converter, and arranged to rotate freely in one direction, but to remain stationary against a turning effort in the other direction.

In such a closed liquid circuit, the liquid on leaving the driving part or pump part under the influence of centrifugal force, passes into the driven or turbine member and on leaving the latter passes between the blades of the reaction member. It will be understood that the velocity of the fluid when leaving the driven member will vary between wide limits depending upon changes of load, and the liquid will leave the vaned recesses at different angles in relation to the blades of the reaction member depending upon the speed and load. A similar result will occur as the liquid arrives back at the vaned recesses of the driving member. Such a result may lead to considerable disturbance in the circulation of the liquid due to the different angles of impingement of the liquid upon the vanes of the reaction member in the one case, and the impingement of the liquid upon the vanes of the driving member in the other case.

One object of the invention to be hereinafter described is to provide means whereby when the speeds of both members are approximately equal, only a minimum of resistance will be offered to the flow of liquid from one member to the other of the relatively moving members, whilst for speeds above or below equality, appropriate guiding will be afforded for the flow of the liquid.

Another object of the invention is to provide means whereby the disturbances in the liquid circuit above referred to, will be avoided and the liquid effectively guided and controlled in passing from the driven member into the reaction member, and from the latter back into the driving member.

A further object of the invention is to introduce a similar control for the liquid at that part of the circuit where the liquid passes from the driving member into the vaned recesses of the driven member.

The invention will now be described with reference to the accompanying drawings in which.

Figure 1:
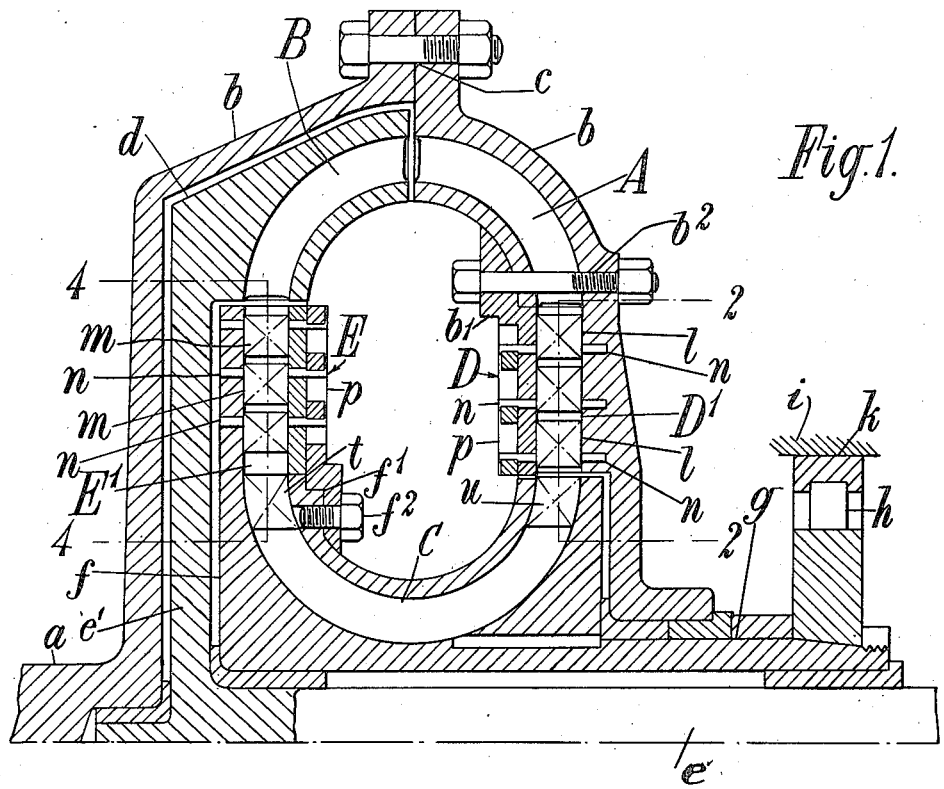
Figure 1 is a half sectional elevation of a torque converter constructed according to the invention.

In carrying the invention into effect according to a preferred embodiment, and referring more especially to Figure 1, $a$ is the power input or driving shaft, secured to which is the hollow driving part $b$ preferably formed in two parts connected together by bolts $c$. The driven member $d$ is nested as usual within the driving part $b$ and is carried by an annular web $e'$ upon the power output or driven shaft $e$. Between the two parts $b$ and $d$ is arranged a reaction member $f$ which is substantially of U-shaped form and has a sleeve portion $g$ in concentric relation to the driven shaft $e$. One limb of the reaction member (the left hand in Figure 1) is as shown of longer radius than the other limb. The sleeve $g$ is extended beyond the driving casing $b$ and its end is fitted with a one-way or free wheel clutch device h including a ring k adapted to be held rigid by being secured to a stationary part i. The details of such a free wheel device are not shown, but the device may be similar to that shown in the specification of my British Patent No. 391,822.

The liquid circuit as shown in Figure 1 is divided into five stages, viz. the vaned driving passage A; the vaned passage B in the driven member; the passage C of the reaction member; the straight or approximately straight radial part D leading from the exit of the reaction passage C to the driving part A; and E a straight radial part preferably parallel to D leading the liquid from the passage B of the driven member d to the inlet of the reaction passage C. It will be understood that the above detailed liquid circuit is only one of a series of the radial circuits provided all round in the hollow casing forming the torque converter.

The part D is formed as an annular chamber D' to one side of which is bolted a ring b' by bolts b², and the part E is also formed as an annular chamber E' to one side of which is bolted a ring f' by means of bolts f². Arranged in both of these annular chambers D', E', there are a series of freely pivoted vanes, those in D are designated by l while those in E are denoted by m. According to the construction shown the vanes l and m, are arranged in three ranks, but it will be understood that one rank or more may be provided if necessary.

Figure 6:
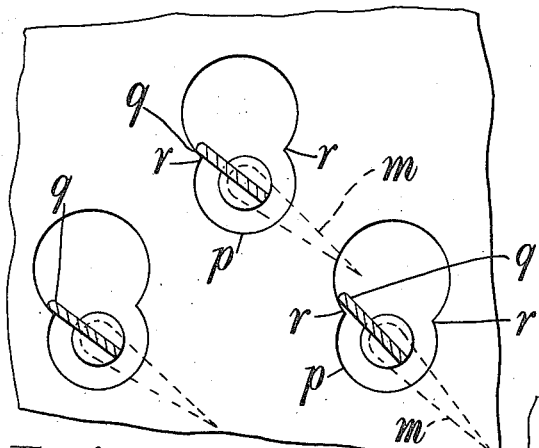
Figure 6 is a side elevation of three of the guide vanes in Figure 4 drawn to an enlarged scale.
Figure 7:
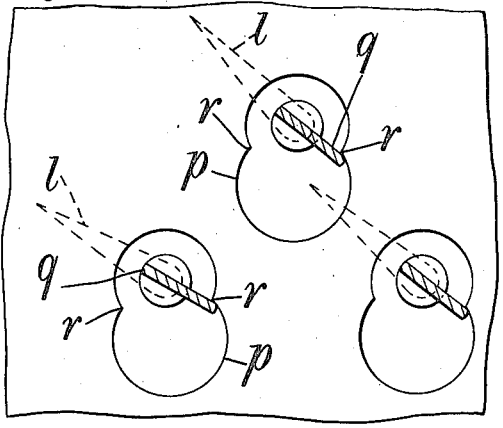
Figure 7 is a similar view of three of the blades in Figure 2.

All of these vanes are mounted on pivotal or trunnion pins n, supported at one end by the driving casing b or the reaction member f in the one case, and at the other end by the ring f' or the ring b' as the case may be. It will also be seen that the vanes l are all carried by the driving part b and that all the vanes m are carried by the reaction member f. Referring more particularly to Figures 6 and 7, these figures illustrate in detail the manner of mounting the vanes. Each vane l or m is fitted at one end with a trunnion pin and is of such a shape that its centre of mass is adjacent such trunnion and the whole is of aerofoil cross section. In each annular chamber D' or E' the vanes are so disposed that the length from the thick end to the thin edge, lies substantially in the flow direction of the liquid circuit which is clearly seen in Figures 2 to 5. The vanes form an easy fit between the side walls of the annular chambers D' or E' and are supported by integral trunnion pins n. In the construction shown the vanes are freely supported by means of the trunnion pins but stops are provided to limit the amount of pivotal movement. For this purpose each trunnion pin on one side is extended beyond its journal bearing into a housing p formed conveniently in the ring f' and b' respectively by two intersecting drilled holes, and such projecting end carries a tail piece q preferably in alignment with the length of the associated vane. By forming the housing p from two holes of different size, a pair of shoulders r opposite one another is provided and between which the tail piece q is adapted to swing, thereby constituting stops to permit the tips of the vanes to move to a predetermined extent on each side of a normal radial line.

Figure 2:
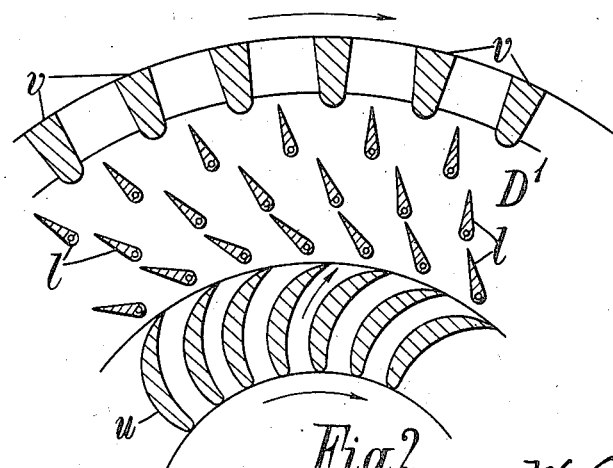
Figure 2 is a section taken on the line 2—2 of Figure 1.
Figure 3:
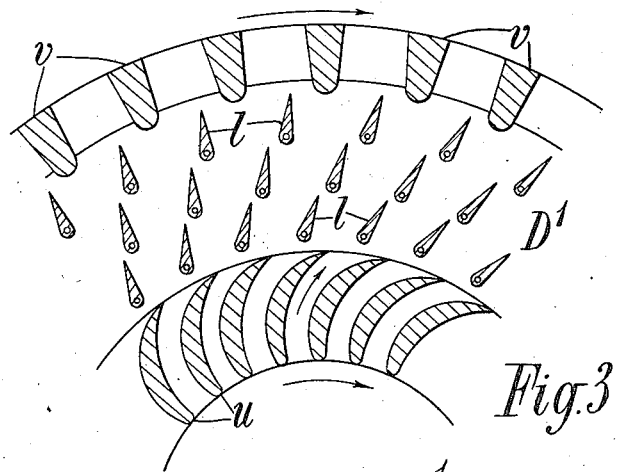
Figure 3 is a sectional view similar to Figure 2 showing certain guiding vanes in a different position.
Figure 4:
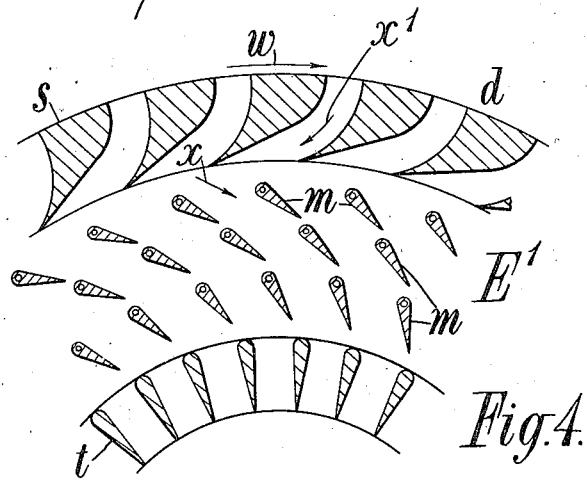
Figure 4 is a section taken on the line 4—4 of Figure 1.
Figure 5:
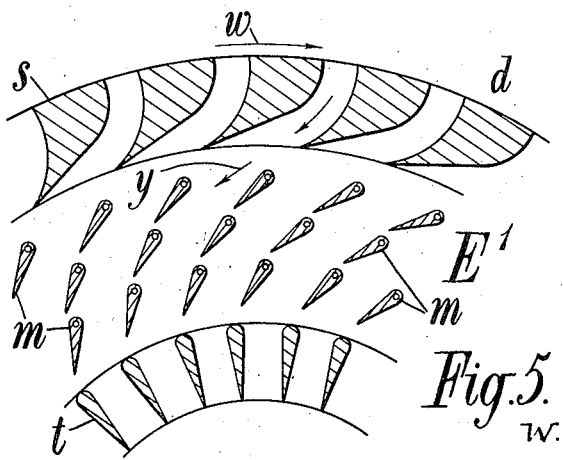
Figure 5 is a view similar to Figure 4 with the guide vanes in a different position.

To co-act with the described pivoted vanes, the outlet ends of the various passages B in the driven member d are directionally vaned as shown at s, Figures 4 and 5, to form a series of tangential nozzles leading the liquid into the reaction member f and such reaction member after the fluid leaves the vanes m is fitted with radial nozzles t which are preferably of the aerofoil section shown. In a similar way and as shown in Figures 2 and 3, a series of tangential nozzles is provided at the outlet end of the reaction member, formed by the curved vanes u, so as to directionally guide the liquid. On returning to the driving element b, the liquid is received by radial nozzles v.

Referring to Figures 4 and 5, assuming that the driven member d is rotating rapidly in the direction of the arrow w, the liquid will be flowing slowly in the direction of the arrow x' making a resultant flow in the direction of the arrow x in relation to the reaction member f, the vanes m assuming the position shown. When however the load is increased the velocity indicated by the arrow w decreases, but the velocity of flow of the liquid through the nozzles s increases, gradually reducing the angle of impingement in the direction of x until it progressively approaches the position of arrow y, Figure 5, the free wheel being locked. A similar adjustment of the vanes l shown in Figures 2 and 3 is effected at the other part of the circuit when the liquid passes from C back to A. Thus when the liquid velocity is low, Figure 2, the vanes l assume the position shown, but when it is high the vanes are swung over to the position shown in Figure 3.

From the foregoing description it will be seen that the vanes l and m will assume a directional position depending upon the relative speeds that are operating, but should however the relative speed conditions change then the vanes will be automatically positioned to give the guidance desired, and assume the angle which is most appropriate to the change in the working conditions. In this way therefore all disturbance of the liquid circuit will be reduced to a minimum.

Figure 8:
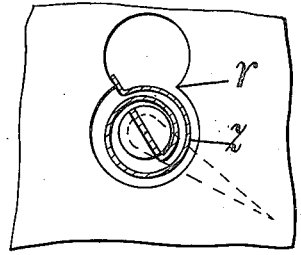
Figure 8 is a view of a spring mounting for a guide vane.

When, and if desired, each of the vane pivots may be so formed however that they are biased to normally assume a radial or other desired position in relation to the central axis. For example as shown in Figure 8 the trunnion pin n may be secured to one end of a coiled spring z, and the other end of the spring caused to abut upon one of the shoulders r. The action of such a spring mounting may tend to draw the associated vane into an approximately radial or other position so that the vane normally assumes this predetermined position in space corresponding to a certain speed which is most appropriate to the speed conditions. Should however these conditions change, the changed angle of impingement will act upon one side or the other side of the vanes so that they will be automatically adjusted against the action of their springs z to assume such an angle as is best suited to the change to afford the necessary guidance to the liquid.

Figure 9:
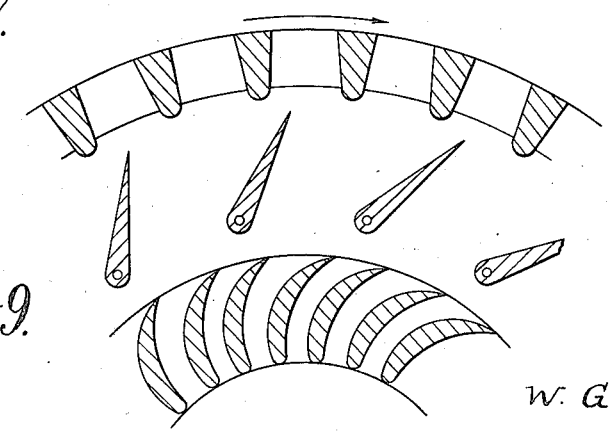
Figure 9 shows a modification in which a single ring of guide vanes is employed.

The invention is not necessarily limited to a triple bank of vanes, for instance a single bank of vanes may be used as shown in the fragmentry view in Figure 9.

From that which is stated above, the pivoted vanes will provide for a series of nozzles adapted to swing into the most appropriate position to receive and pass on the liquid in the circuit, at any change in the running conditions. Moreover the vanes will have no contact with or overlap one another and as shown they are all relatively staggered; the space through which each vane may move being such that their mutual adjustment will interfere as little as possible with the flow of liquid that occurs between the banks of vanes or any two members of each set.

It is to be understood that the banks of vanes will be also under the influence of centrifugal action as well as under their springs and in determining the latter value, centrifugal action must be taken into account.

I claim:

1. In a hydraulic power transmitting device comprising driving and driven elements, and a reaction element positioned between said driving and driven elements each of said elements being provided with a series of fixed vanes which form radial passages through which the liquid flows from one element to the other in a closed circuit, the provision in the driving element, between the inlet end of the radial passages thereof and the outlet end of the radial passages of the reaction element, of an annular space within which are positioned a series of freely pivoting vanes each of which is separately mounted in the side walls of the driving element so as to lie in the path of the liquid and is acted upon by said liquid independently of the others, so that when a change of speed occurs between the driving and driven elements, the said pivotal vanes are automatically adjusted by a changing angle of impingement into such a position as will afford the most appropriate guidance for the passage of liquid from one element to the other.

2. A hydraulic power transmitting device as claimed in claim 1, in which an annular space is also provided in the reaction element, between the inlet end of the radial passages thereof and the outlet end of the radial passages of the driven element, a series of freely pivoting vanes being positioned within the said space, each vane being separately mounted in the side walls of the reaction member so as to lie in the path of the liquid and acted upon by said liquid independently of the others, so that when a change of speed occurs between the driving and driven elements, the said pivotal vanes are automatically adjusted by a changing angle of impingement into such a position as will afford the most appropriate guidance for the passage of the liquid from one element to the other.

3. A hydraulic power transmitting apparatus as claimed in claim 1, in which the reaction member is provided with a one-way clutch and is thereby capable of free movement in one direction, but remains stationary when a force is applied in the opposite direction.

4. A hydraulic power transmitting apparatus as claimed in claim 1, in which the freely pivoted blades have their centre of mass near their pivotal centres, and so arranged that the length of the blades from the pivot extends in the direction of flow of the liquid circuit.

5. A hydraulic power transmitting apparatus as claimed in claim 1, in which the vanes are of aerofoil section.

6. A hydraulic power transmitting apparatus as claimed in claim 1, in which as the angle of impingement of the liquid in leaving one rotating part changes, due to alterations in the load conditions, so the liquid acts upon one side or the other of the series of pivoted vanes to automatically position them so that they afford to the moving liquid the most appropriate guidance to minimize disturbance in the liquid flow.

7. A hydraulic torque converter as claimed in claim 1 in which the reaction member is of U-shaped form, and in which one limb thereof is of longer radius than the other, i. e. the limb which receives the flow from the driven member.

8. A hydraulic power transmitting device as claimed in claim 1, in which the series of freely pivoted vanes are arranged in banks and are staggered and so spaced apart that however they move they do not interfere substantially with the flow of liquid.

9. A hydraulic power transmitting device as claimed in claim 1, in which the pivoted vanes are fitted with a spring mounting to afford bias or a limited amount of movement.

WALTER GORDON WILSON.